United States Patent
Buller et al.

(10) Patent No.: US 8,935,355 B2
(45) Date of Patent: Jan. 13, 2015

(54) PERIODIC SHUFFLING OF DATA FRAGMENTS IN A PEER-TO-PEER DATA BACKUP AND ARCHIVAL NETWORK

(75) Inventors: Steven J. Buller, Morrisville, NC (US); Richard C. Garrett, Oro Valley, AZ (US); Richard Hutzler, Corono de Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 12/244,769

(22) Filed: Oct. 2, 2008

(65) Prior Publication Data
US 2010/0088389 A1 Apr. 8, 2010

(51) Int. Cl.
G06F 15/167 (2006.01)
G06F 11/14 (2006.01)
G06F 17/30 (2006.01)
G06F 21/62 (2013.01)

(52) U.S. Cl.
CPC ...... *G06F 17/30209* (2013.01); *G06F 11/1464* (2013.01); *G06F 17/30073* (2013.01); *G06F 21/6227* (2013.01)
USPC .......................................................... 709/216

(58) Field of Classification Search
USPC .......................................................... 709/216
See application file for complete search history.

(56) References Cited

U.S. PATENT DOCUMENTS

| | | | |
|---|---|---|---|
| 6,438,642 B1 * | 8/2002 | Shaath ........................... 711/100 |
| 7,139,809 B2 * | 11/2006 | Husain et al. ................. 709/213 |
| 7,330,997 B1 * | 2/2008 | Odom ................................ 714/6 |
| 7,584,285 B2 * | 9/2009 | Hudson et al. ................. 709/228 |
| 2002/0065837 A1 * | 5/2002 | Roach et al. ................... 707/200 |
| 2002/0174443 A1 | 11/2002 | Bushmitch et al. |
| 2003/0070077 A1 | 4/2003 | Redlich et al. |
| 2003/0115251 A1 * | 6/2003 | Fredrickson et al. ......... 709/201 |
| 2004/0039829 A1 * | 2/2004 | Bucher ......................... 709/229 |
| 2005/0039030 A1 | 2/2005 | Rodgers et al. |
| 2006/0224756 A1 | 10/2006 | Yu et al. |
| 2006/0259573 A1 | 11/2006 | Goodman et al. |
| 2007/0038612 A1 * | 2/2007 | Sull et al. ............................ 707/3 |
| 2007/0061266 A1 * | 3/2007 | Moore et al. ..................... 705/51 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0204115 A1 * | 8/2007 | Abramson ..................... 711/154 |
| 2007/0276925 A1 * | 11/2007 | La Joie et al. ................. 709/219 |
| 2008/0155120 A1 * | 6/2008 | Argawal et al. ............... 709/242 |

\* cited by examiner

*Primary Examiner* — Hee Soo Kim
*Assistant Examiner* — Blake Rubin
(74) *Attorney, Agent, or Firm* — Steven M. Greenberg, Esq.; CRGO Law

(57) ABSTRACT

Embodiments of the present invention address deficiencies of the art in respect to data backup and archival tools and provide a method, system and computer program product for periodically shuffling data fragments in a data backup set across different storage media in a peer-to-peer data backup and archival network. In an embodiment of the invention, a method for periodic shuffling of data fragments in a data backup set across different storage media in a peer-to-peer data backup and archival network can be provided. The method can include partitioning a file into multiple, different fragments for storage in a peer-to-peer data backup and archival network, storing the fragments in different peer hosts in the peer-to-peer data backup and archival network, and periodically shuffling the stored fragments to different peer hosts. In an aspect of the embodiment, the method also can include encrypting the fragments before storage in the different peer hosts.

11 Claims, 2 Drawing Sheets

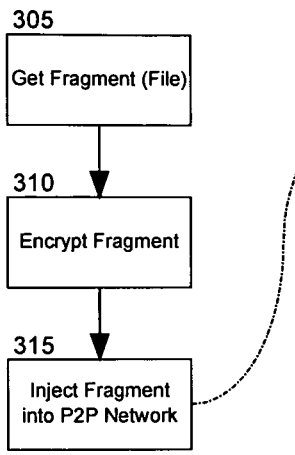
FIG. 3A
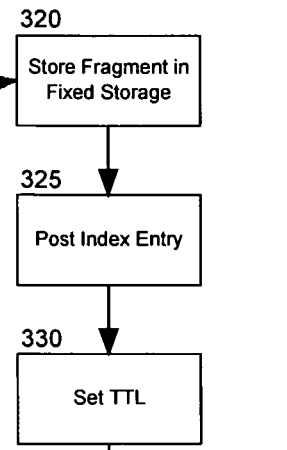
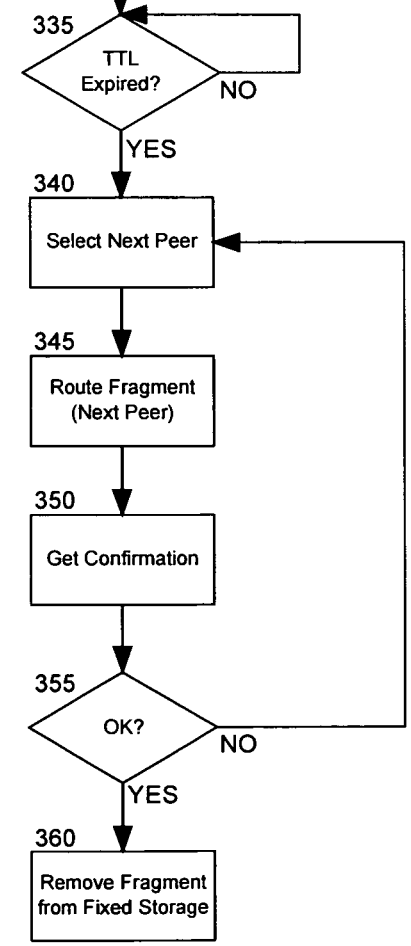
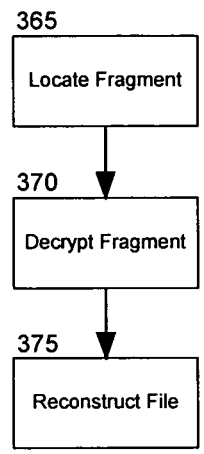
FIG. 3B
FIG. 3C

PERIODIC SHUFFLING OF DATA FRAGMENTS IN A PEER-TO-PEER DATA BACKUP AND ARCHIVAL NETWORK

REFERENCE TO CO-PENDIND APPLICATIONS FOR PATENT

The present application is related to the following co-assigned U.S. patent applications, which are expressly incorporated by reference herein:

U.S. application Ser. No. 12/244,764, entitled "ENCRYPTION OF DATA FRAGMENTS IN A PEER-TO-PEER DATA BACKUP AND ARCHIVAL NETWORK", filed on Oct. 2, 2008.

U.S. application Ser. No. 12/244.767, entitled "DISPERSAL AND RETRIEVAL OF DATA FRAGMENTS IN A PEER-TO-PEER DATA BACKUP AND ARCHIVAL NETWORK", filed on Oct. 2, 2008.

BACKGROUND OF THE INVENTION

1. Field of the Invention

The present invention relates to the field of data backup and archival tools and more particularly to data fragment dispersal about a computer communications network for data backup and archiving.

2. Description of the Related Art

The advent of personal computing revolutionized both the collection and generation of data in the personal and industrial environments. Prior to the widespread adoption of computing, data collection meant paper—lots of it. Data archival and retrieval referred to nothing more than the filing of paper in a filing cabinet indexed for relative ease of retrieval. As the volume of data grew, so too did the physical space requirements for filing cabinets. Data archives of more significant volume necessarily involved microfiche—photographs of data in order to reduce the physical space requirements of filing cabinets. Thus, the evolution of electronic data collection and storage literally saved the world from filing cabinet overpopulation.

The replacement of physical paper with electronic data, however, produced its own set of critical issues. First and foremost, data security remains of paramount importance. That is to say, since unlimited copies of data can be generated with the stroke of a key on a keyboard, it is imperative that only authorized individuals can access electronic data. Further, without data backup no one would rely upon electronic data lest a minor electro-mechanical malfunction of a disk drive result in the loss of critical information. Accordingly, two separate industries focused respectively upon data security and data backup and archival tools arose.

Traditional data backup and archival tools rely upon the principal of redundancy in placing copies of important data in different places so that a malfunction in one data storage medium is of minimal consequence. Advanced data backup and archival tools not only perform periodic backup operations, but also live backup operations in real time with the concurrent writing of data to multiple disk media. Of course, sophisticated data backup and archival tools also implement different degrees of data encryption and access control to effectuate correspondingly different level of data security.

Traditional data backup and archival tools can be expensive not only in the direct cost of software licensing, but also in respect to indirect costs like the establishment and maintenance of server farms supporting data backup and retrieval operations. Consequently, many users opt to outsource data backup and archiving to third party vendors who bear the burden of the expense of maintaining proper infrastructure. Engaging an outsourced provider of data backup and archival services, however, still can be very expensive and requires end users to acquire a certain degree of trust in the reliability and longevity of the provider. In particular, end users often lack the confidence that an outside vendor can maintain the security and confidentiality of data archived in storage controlled by the vendor.

Recognizing the difficulty of trusting third party vendors to perform data back and archival services, data backup and archival tools have been developed to disperse different files across many different servers such that the entirety of a data backup set is not entrusted within a single storage medium. As such, obtaining access to a given storage medium cannot result in corresponding access to the entire backup set. Even further, by utilizing existing servers in trusted server farms, a third party vendor providing this type of distributed data backup and archival service need not incur enormous infrastructure maintenance expense. Rather, the third party vendor need only maintain an index of where different files in a backup set can be located amongst a distributed grouping of servers. Even still, in as much as portions of the backup data set statically reside in the same location over time, data security remains partly exposed to compromise.

BRIEF SUMMARY OF THE INVENTION

Embodiments of the present invention address deficiencies of the art in respect to data backup and archival tools and provide a novel and non-obvious method, system and computer program product for periodically shuffling data fragments in a data backup set across different storage media in a peer-to-peer data backup and archival network. In an embodiment of the invention, a method for periodic shuffling of data fragments in a data backup set across different storage media in a peer-to-peer data backup and archival network can be provided. The method can include partitioning a file into multiple, different fragments for storage in a peer-to-peer data backup and archival network, storing the fragments in different peer hosts in the peer-to-peer data backup and archival network, and periodically shuffling the stored fragments to different peer hosts. In an aspect of the embodiment, the method also can include encrypting the fragments before storage in the different peer hosts.

In another embodiment of the invention, a peer-to-peer data backup and archival network can be configured for periodic shuffling of data fragments in a data backup set across different storage media. The network can include a data backup and archival tool providing an interface for providing a file to be stored in the peer-to-peer backup and archival network. The network also can include peer hosts coupled to the tool. Finally, the network can include peer-to-peer fragment shuffler program code coupled to each of the peer hosts. The program code can be enabled to store fragments for the file and to periodically shuffle the stored fragments to different peer hosts. In this regard, each of the fragments can include a time to live (TTL) value which upon expiration triggers a periodic shuffling of a corresponding one of the fragments to a new one of the peer hosts.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for periodically shuffling data fragments in a data backup set across different storage media in a peer-to-peer data backup and archival network. In accordance with an embodiment of the present invention, a data backup set can be partitioned into fragments, encrypted and dispersed about different storage media in a peer-to-peer data backup and archival network. Periodically, the different fragments can be shuffled to different storage media in the peer-to-peer data backup and archival network such that the different fragments only transiently reside in a given storage medium. In this way, security for archived data can be optimized while utilizing excess storage capacity in the peer-to-peer data backup and archival network.

Figure 1:
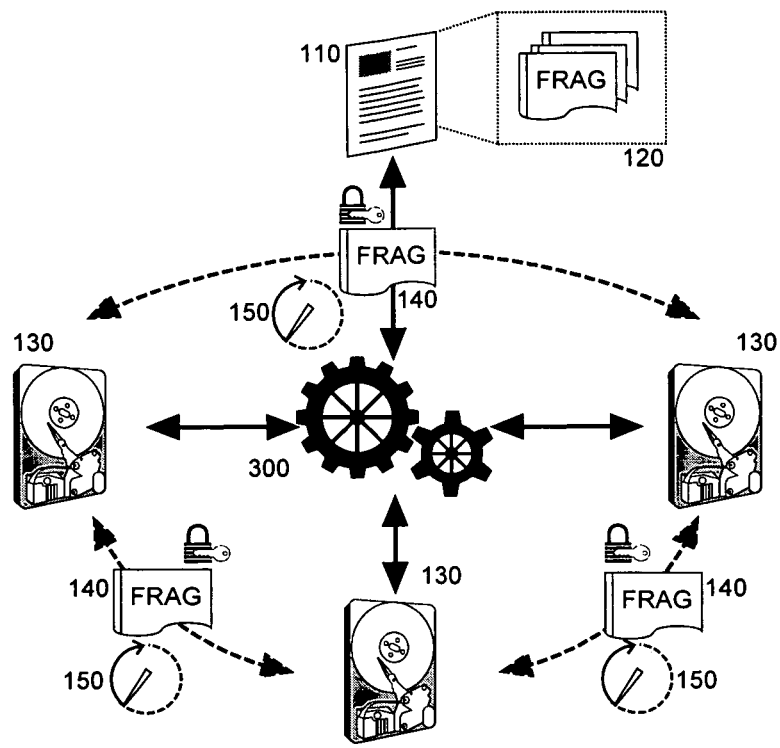
FIG. 1 is a pictorial illustration of a peer-to-peer data backup and archival network configured for periodic shuffling of data fragments in a data backup set across different storage media.

In further illustration, FIG. 1 is a pictorial illustration of a peer-to-peer data backup and archival network configured for periodic shuffling of data fragments in a data backup set across different storage media. As shown in FIG. 1, a file 110 can be partitioned into different fragments 120, for example individual sets of multiple bytes. Preferably, each fragment contains no repeating instances of any byte and each fragment can be of any byte length. The fragments 120 can be individually encrypted and each encrypted fragment 140 can be injected into selected data storage media 130 arranged in a peer-to-peer data backup and archival network. Peer-to-peer fragment shuffler program code 300 can assign a TTL value 150 to each encrypted fragment 140. Subsequently, when the TTL value 150 expires, peer-to-peer fragment shuffler program code 300 can assign a new TTL value 150 to the encrypted fragment 140 and can move the encrypted fragment 140 with the new TTL value 150 to a new selected data storage medium 130. In this way, each encrypted fragment 140 never remains statically placed in a single, selected data storage medium 130 and even while positioned in a single selected data storage medium, the encrypted fragment 140 is secured by way of encryption at the fragment level. Furthermore, the social aspect of the peer-to-peer arrangement requires a minimum of investment in infrastructure cost.

Figure 2:
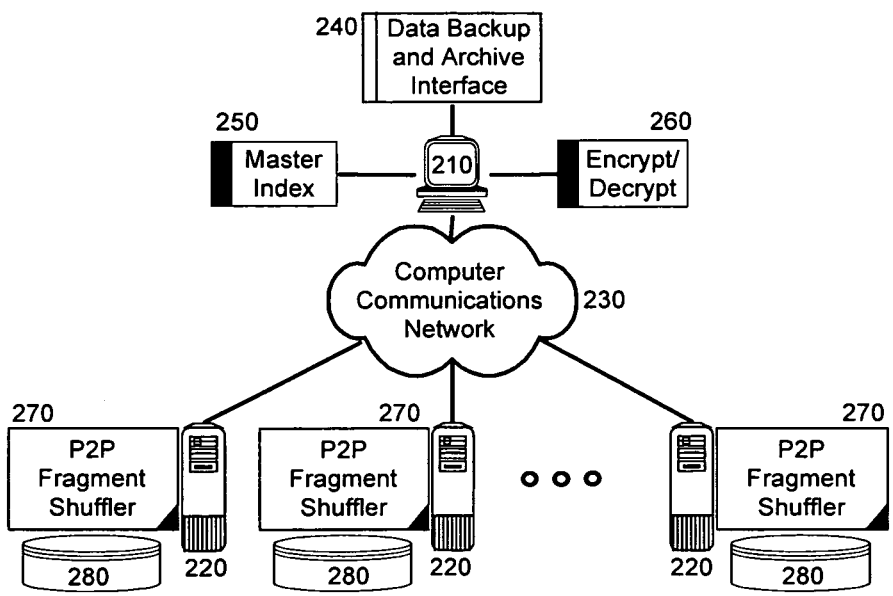
FIG. 2 is a schematic illustration of a peer-to-peer data backup and archival network configured for periodic shuffling of data fragments in a data backup set across different storage media; and, FIGS. 3A through 3C, taken together, are a flow chart illustrating a process for periodic shuffling of data fragments in a data backup set across different storage media in a peer-to-peer data backup and archival network.

In yet further illustration, FIG. 2 schematically shows a peer-to-peer data backup and archival network configured for periodic shuffling of data fragments in a data backup set across different storage media. The network can include multiple different peer hosts 220 communicatively coupled to one another in a peer-to-peer arrangement over computer communications network 230. Each of the peer hosts 220 can be coupled to a data storage medium 280 into which data fragments can be stored. Further, each of the peer hosts 220 can support the operation of peer-to-peer fragment shuffler program code 270.

The peer-to-peer fragment shuffler program code 270 can be enabled to monitor the TTL for a fragment stored in coupled data storage medium 280 to determine when to shuffle the fragment into the data storage medium 280 of a different one of the peer hosts 220. The peer-to-peer fragment shuffler program code 270 further can be enabled to report to master index 250 a location of a fragment when successfully stored in coupled data storage medium 280. In this regard, the master index 250 can be included as part of a data backup and archive tool 210 communicatively coupled to each of the peer hosts 220 in the peer-to-peer network of peer hosts 220 over computer communications network 230. Consequently, master index 250 can provide a centralized view of a location of all fragments of a file archived about the peer-to-peer network of peer hosts 220.

Optionally, the program code of the peer-to-peer fragment dispersal logic 270 can be enabled to forego the usage of master index 250. Instead, the location of a fragment can remain unknown over time amongst the peer hosts 220 in the peer-to-peer network of peer hosts 220. As such, the program code of the peer-to-peer fragment dispersal logic 270 can be enabled to broadcast a request for retrieval when required to the peer hosts 220 and the peer hosts 220 individually can respond to the broadcast request by returning any stored fragments within the individual ones of the peer hosts 220 in the peer-to-peer network of peer hosts 220.

The data backup and archive tool 210 can provide an interface 240 to external users through which files can be received for archive and retrieval into the peer-to-peer network. Even yet further, the data backup and archive tool 210 can include encryption and decryption logic 260 such that fragments for different files can be encrypted before injection into the peer-to-peer network and decrypted upon retrieval from the peer-to-peer network.

In even yet further illustration, FIG. 3A through 3C, taken together, are a flow chart illustrating a process for periodic shuffling of data fragments in a data backup set across different storage media in a peer-to-peer data backup and archival network. Beginning in block 305, a fragment for a file can be retrieved for data archive in the peer-to-peer network. In block 310, the fragment can be encrypted and in block 315, the encrypted fragment can be injected into the peer-to-peer network through the selection of a particular peer host and the transmission of the encrypted fragment to the selected peer host.

In block 320, within the selected peer host, the encrypted fragment can be stored in fixed storage and in block 325, an index entry can be returned indicating the successful storage of the encrypted fragment in the selected peer host. Additionally, a TTL value can be set for the encrypted fragment. Thereafter, in decision block 335, it can be determined whether or not the TTL value has expired for the encrypted fragment. If so, the process can continue through block 340.

In block 340, once the TTL has expired, a next peer host in the peer-to-peer network can be selected and the encrypted fragment can be transmitted to the next peer host in block 345.

In block 350, confirmation of the successful storage of the encrypted fragment can be received from the next peer host. In decision block 355, if the encrypted fragment has not been successfully stored in the next peer host, the process can repeat through block 340. Otherwise, in block 360 the encrypted fragment can be removed from fixed storage.

Finally, encrypted fragments can be retrieved from the peer-to-peer network for re-assembly into the archived file. Specifically, in block 365, an encrypted fragment can be located in a peer host by reference to an index of fragments for a file and in block 370, the encrypted fragment can be decrypted. Finally, in block 375, the decrypted fragment can be combined with other decrypted fragments to form the re-assembled form of the archived file.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for periodic shuffling of data fragments in a data backup set across different storage media in a peer-to-peer data backup and archival network, the method comprising:

partitioning a file into multiple, different fragments for storage in a peer-to-peer data backup and archival network;

storing the fragments in different peer hosts in the peer-to-peer data backup and archival network;

periodically shuffling the stored fragments to different peer hosts; and broadcasting, to all of the different peer hosts, a request to retrieve the stored fragments, wherein a location of the stored fragments are not recorded in a master index for the file.

2. The method of claim 1, further comprising
encrypting the fragments before storage in the different peer hosts.

3. The method of claim 1, wherein
the file is partitioned into multiple multi-byte-sized fragments.

4. The method of claim 1, wherein
the periodically shuffling the stored fragments to the different peer hosts, comprises:

monitoring time to live (TTL) values for each of the fragments stored in respective ones of the different peer hosts; and moving fragments with expired TTL values from hosting ones of the different peer hosts to new ones of the different peer hosts.

5. A peer-to-peer data backup and archival network configured for periodic shuffling of data fragments in a data backup set across different storage media, the network comprising:

a plurality of peer hosts;

a data backup and archival tool coupled to the plurality of peer hosts and configured to store a file in the peer-to-peer backup and archival network, and broadcast, to all of the plurality of the coupled peer hosts, a request to retrieve fragments for the file;

a plurality of peer hosts coupled to the tool; and peer-to-peer fragment shuffler program code coupled to each of the peer hosts, the program code configured to store the fragments for the file, and periodically shuffle the stored fragments to different peer hosts, wherein a location of the stored fragments are not recorded in a master index for the file.

6. The network of claim 5, wherein
the fragments are encrypted bytes of the file.

7. The network of claim 5, wherein
each of the fragments comprises a time to live (TTL) value which upon expiration triggers a periodic shuffling of a corresponding one of the fragments to a new one of the peer hosts.

8. A computer program product comprising a non-transitory computer usable storage medium having stored therein computer usable program code for periodic shuffling of data fragments in a data backup set across different storage media in a peer-to-peer data backup and archival network, the computer usable program code, which when executed by a computer hardware system causing the computer hardware system to perform partitioning a file into multiple, different fragments for storage in a peer-to-peer data backup and archival network;

storing the fragments in different peer hosts in the peer-to-peer data backup and archival network;

periodically shuffling the stored fragments to different peer hosts; and broadcasting, to all of the different peer hosts, a request to retrieve the stored fragments, wherein a location of the stored fragments are not recorded in a master index for the file.

9. The computer program product of claim 8, wherein the computer hardware device is further caused to perform
encrypting the fragments before storage in the different peer hosts.

10. The computer program product of claim 8, wherein the file is partitioned into multiple multi-byte sized fragments.

11. The computer program product of claim 8, wherein the periodically shuffling the stored fragments to the different peer hosts comprises:
monitoring time to live (TTL) values for each of the fragments stored in respective ones of the different peer hosts; and
moving fragments with expired TTL values from hosting ones of the different peer hosts to new ones of the different peer hosts.

* * * * *